United States Patent
Corcoran et al.

(10) Patent No.: US 10,896,357 B1
(45) Date of Patent: Jan. 19, 2021

(54) AUTOMATIC KEY/VALUE PAIR EXTRACTION FROM DOCUMENT IMAGES USING DEEP LEARNING

(71) Applicant: Automation Anywhere Inc., San Jose, CA (US)

(72) Inventors: Thomas Corcoran, San Jose, CA (US); Nishit Kumar, San Jose, CA (US); Bruno Selva, Mountain View, CA (US); Derek S Chan, San Jose, CA (US); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 52 days.

(21) Appl. No.: 15/858,976

(22) Filed: Dec. 29, 2017

(51) Int. Cl.
*G06K 9/72* (2006.01)
*G06K 9/00* (2006.01)
*G06T 5/00* (2006.01)
*G06K 9/62* (2006.01)

(52) U.S. Cl.
CPC ......... *G06K 9/726* (2013.01); *G06K 9/00463* (2013.01); *G06K 9/6262* (2013.01); *G06T 5/002* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 6,009,198 A * | 12/1999 | Syeda-Mahmood | G06K 9/00463 382/173 |
| 6,397,215 B1 | 5/2002 | Kreulen et al. | |
| 8,504,803 B2 | 8/2013 | Shukla | |
| 8,724,907 B1 * | 5/2014 | Sampson | G06K 9/6255 382/209 |
| 9,462,042 B2 | 10/2016 | Shukla et al. | |

(Continued)

OTHER PUBLICATIONS

X. Yang, E. Yumer, P. Asente, M. Kraley, D. Kifer and C. L. Giles, "Learning to Extract Semantic Structure from Documents Using Multimodal Fully Convolutional Neural Networks," 2017 IEEE CVPR, Honolulu, HI, 2017, pp. 4342-4351. doi: 10.1109/CVPR.2017.462 (Year: 2017).*

(Continued)

*Primary Examiner* — Jiangeng Sun
(74) *Attorney, Agent, or Firm* — Appleton Luff

(57) ABSTRACT

Key/Value pairs, each comprising a keyword string and an associated value, are extracted automatically from a document image. Each document image has a plurality of pixels with each pixel having a plurality of bits. A first subset of the plurality of bits for each pixel represents information corresponding to the document image. The document image is processed to add information to a second subset of the plurality of bits for each pixel. The information added to the second subset alters the appearance of the document image in a manner that facilitates semantic recognition of textually encoded segments within the document image by a Deep Neural Network (DNN) trained to recognize images within image documents. The DNN detects groupings of text segments within detected spatial templates within the document image. The text segments are mapped to known string values to generate the keyword strings and associated values.

20 Claims, 12 Drawing Sheets

(56) References Cited

U.S. PATENT DOCUMENTS

| | | | |
|---|---|---|---|
| 2002/0029232 A1* | 3/2002 | Bobrow | G06K 9/00463 514/534 |
| 2004/0158455 A1* | 8/2004 | Spivack | G06F 16/367 704/9 |
| 2006/0045337 A1* | 3/2006 | Shilman | G06K 9/00402 382/181 |
| 2006/0070026 A1* | 3/2006 | Balinsky | G06F 17/211 717/106 |
| 2008/0104032 A1* | 5/2008 | Sarkar | G06F 16/958 |
| 2015/0306763 A1 | 10/2015 | Meier et al. | |
| 2016/0019049 A1 | 1/2016 | Kakhandiki et al. | |
| 2016/0078368 A1 | 3/2016 | Kakhandiki et al. | |
| 2016/0101358 A1 | 4/2016 | Ibrahim et al. | |
| 2016/0119285 A1 | 4/2016 | Kakhandiki et al. | |
| 2017/0060108 A1 | 3/2017 | Kakhandiki et al. | |
| 2018/0004823 A1 | 1/2018 | Kakhandiki et al. | |
| 2018/0232888 A1 | 8/2018 | Thevenet et al. | |
| 2018/0285634 A1 | 10/2018 | Varadarajan et al. | |
| 2019/0236411 A1 | 8/2019 | Zhu et al. | |

OTHER PUBLICATIONS

Minghui Liao, Baoguang Shi, Xiang Bai, Xinggang Wang, Wenyu Liu, "TextBoxes: A Fast Text Detector with a Single Deep Neural Network", arXiv:1611.06779v1 [cs.CV] Nov. 21, 2016 (Year: 2016).*

Meng Q!i, Xiang Ren, and Jiawei Han, "Automatic Synonym Discovery with Knowledge Bases". In Proceedings of KDD'I 7, Aug. 13-17, 2017, Halifax, NS, Canada, DOI: 10.1145/3097983. 3098185 (Year: 2017).*

Chollet, Francois et al., Keras: The Python Deep Learning Library, GitHub, https://github/keras-team/keras, 2015.

Liu, Wei et al., SSD: Single Shot MultiBox Detector, Mar. 30, 2016.

Ren, Shaoqing, Faster R-CNN: Towards Real-Time Object Detection with Region Proposal Networks, IEEE Transactions on Pattern Analysis and Machine Intelligence—2017.

Dilated Convolutions and Kronecker Factored Convolutions, May 12, 2016.

* cited by examiner

AUTOMATION ANYWHERE — 712

Automation Anywhere, Inc. — 703
633 River Oaks Pkwy
SanJose, CA 95134

Bill To:
Your Company, Inc. — 704
123 Fake St.
SanJose, CA 95134

INVOICE — 701
7936248 — 702

Date: Dec 4, 2017 — 705
Payment Terms: NET 30 — 706
Due Date: Jan 1, 2018 — 707
Balance Due: $66.49 — 708

| Item | Quantity | Rate | Amount |
|---|---|---|---|
| Widget | 3 | $1 | $3 |
| Gadget | 4 | $2 | $8 |
| Stuff | 100 | $0.50 | $50 |

709

Subtotal $61
Tax (9%) $5.49 — 710
Total $66.49

INVOICE
7836248

Date: Dec 4, 2017
Payment Terms: NET 30
Due Date: Jan 1, 2018
Balance Due: $66.49

Automation Anywhere, Inc.
633 River Oaks Pkwy
San Jose, CA 95134

Bill To:
Your Company, Inc.
123 Fake St.
San Jose, CA 95134

| Item | Quantity | Rate | Amount |
|---|---|---|---|
| Widget | 3 | $1 | $3 |
| Gadget | 4 | $2 | $8 |
| Stuff | 100 | $0.50 | $50 |

Subtotal: $61
Tax (9%): $5.49
Total: $66.49

FIG. 9

AUTOMATIC KEY/VALUE PAIR EXTRACTION FROM DOCUMENT IMAGES USING DEEP LEARNING

FIELD OF THE DISCLOSURE

This disclosure relates generally to the field of data processing systems and more particularly to detection and retrieval of information from digitized documents.

BACKGROUND

Accurate identification and extraction of data from business documents is an important aspect of computerized processing of business documents. Traditional document-image data-capture systems are limited by the need to manually create template extraction zones. These systems require a user to mark spatial zones on the document and tag the zones with appropriate labels. Once a template is created, the pixels within the zones are converted to digital text using optical character recognition (OCR) and formatted into structured data using the assigned labels. This manual type of process can be quite time consuming and expensive, particularly when large volumes of documents with different layouts need to be processed. A template needs to be manually created for each layout. There is accordingly a need for a technical solution to the aforementioned manual approach.

SUMMARY

A system for automatically creating extraction templates consisting of spatial coordinates tagged with semantic labels for novel layout structures using deep neural networks is disclosed herein. The system employs a deep-learning based object-detection system for creating templates on document images and a novel way of preprocessing the document image for object detection. The system processes document images to automatically extract key/value pairs of interest from the document.

In certain embodiments, the principles described herein may be employed in a computerized method for automatically extracting keyword strings and associated values from a document image. Each document image is comprised of a plurality of pixels wherein each pixel within the document image is comprised of a plurality of bits. A first subset of the plurality of bits for each pixel represents information corresponding to the document image. The document image is processed to add information to a second subset of the plurality of bits for each pixel, wherein the second subset does not overlap with the first subset. The information added to the second subset alters the appearance of the document image in a manner that facilitates semantic recognition of textually encoded segments within the document image by a deep neural network trained to recognize object classes within image documents. The deep neural network detects relevant groupings of text segments within detected spatial templates within the document image, wherein each text segment is associated with a spatial template. The text segments are mapped to known string values to generate the keyword strings and associated values, wherein the keyword string is representative of semantic meaning of the text segment grouping.

Additional aspects related to the invention will be set forth in part in the description which follows, and in part will be apparent to those skilled in the art from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 7 illustrates output of a normative renderer.

FIG. 9 illustrates sample output for the ensembler of FIG. 1

DETAILED DESCRIPTION

Figure 1:
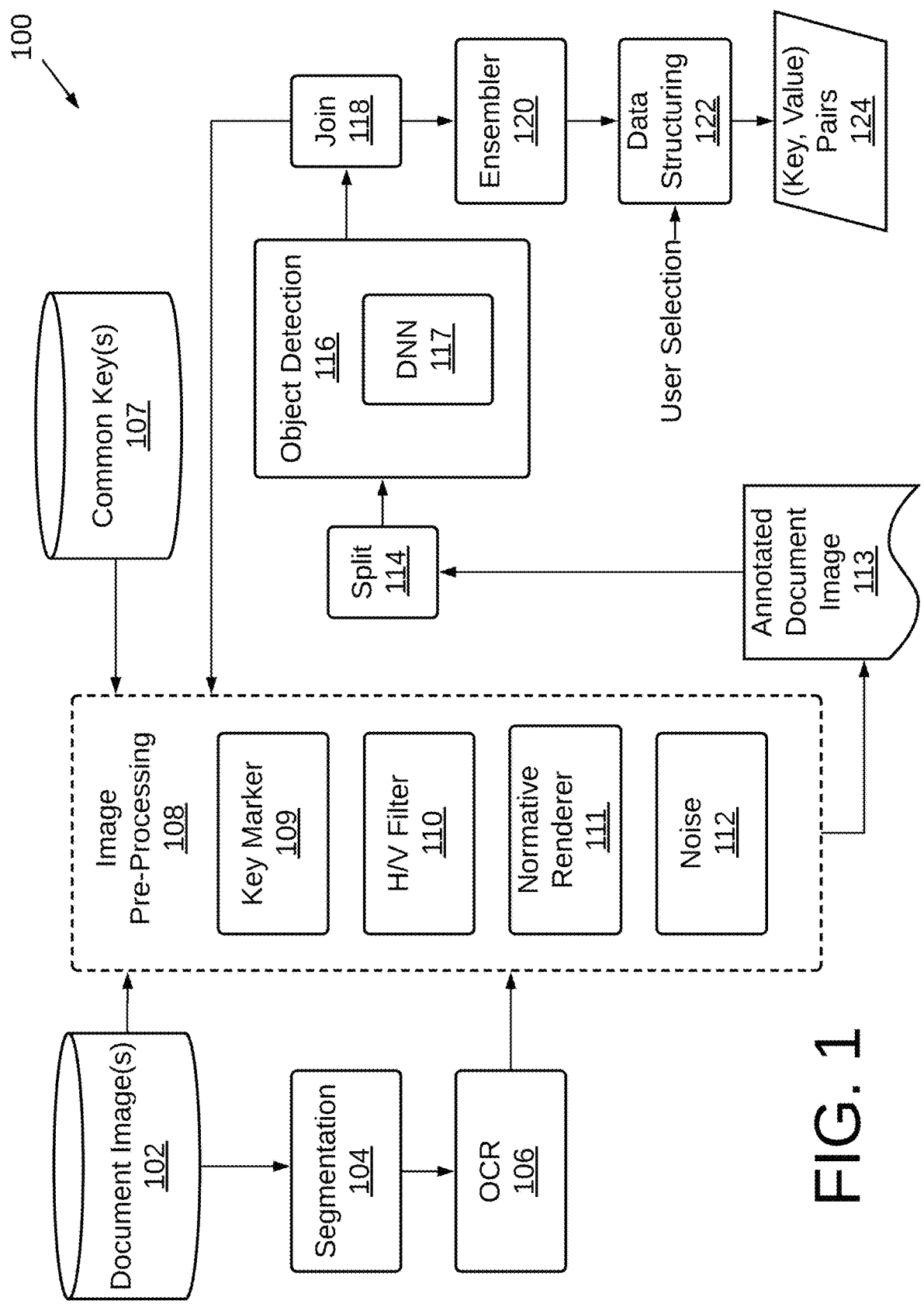
FIG. 1 is a high-level block diagram of an embodiment of a system for extracting key/value pairs from document images.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

A system for automatically creating extraction templates consisting of spatial coordinates tagged with semantic labels for novel layout structures using deep neural networks is disclosed herein. The system employs deep-learning based object-detection for creating templates on document images and a novel way of preprocessing the document image for object detection. The system processes document images to extract key/value pairs of interest from the document.

The system may work alongside a manual system, thereby improving the straight-through-processing (STP) metric of the combined system. In such a hybrid document data-capture-system the documents are first classified in groups based on document layout. For layout groups containing large number of documents the user first designs extraction templates, then the human created templates are used to extract the data in documents within the specific layout groups. For all other documents belonging to classification groups with fewer documents, the automatic template-creation and tagging engine disclosed herein is employed to extract key-value pairs without human intervention. Without the manual template-creation system the STP of the system is limited by the number of layout groups that human can manually create templates for. Other layout groups are left unprocessed. In typical deployments, there are thousands of layout groups, but only a few hundred groups can ever undergo manual template creation.

The system may also be employed to solve a variety of problems on document images involving detection of other semantic elements, beyond detecting key/value pairs, such as, detecting tables, detecting checkboxes, detecting table headers, etc.

Object detection is the problem of drawing a bounding box (BB) around an object of interest in a scene, for example, drawing a BB around a cat in a scene. Recent breakthroughs in deep learning have enabled training of Deep Neural Networks (DNN) for detecting arbitrary object classes. These DNNs detect objects at impressive accuracy levels, rivaling humans. The system disclosed herein trains a DNN for drawing BBs around key/value pairs in a document image. There are a number of limitations however in employing a DNN for drawing BBs around key/value pairs in a document image. DNNs that are employed for object detection generally operate on natural images, which contain color cues for the object-of-interest spanning the entire BB. A binarized document, on the other hand, contains few single-color pixels sparsely scattered across the image. That makes it harder for a DNN to predict BBs for such images. Also, the number of BBs per image necessary for the key/value extraction problem (10's of BBs) far exceeds the number of BBs for detecting objects in natural scenes (less than 10).

The disclosed embodiments are designed to address the above limitations. Moreover, the disclosed embodiments are designed to maximize 'recall' at the expense of lower 'precision'. That is, the DNN makes many more BB predictions than necessary, to achieve a goal to have a BB for as many key/value pairs as possible. The downstream steps are designed to drop predicted BBs that do not contain a key/value, or contain a key/value only partially. The disclosed embodiments employ deep learning programs for OCR and object detection, and machine learning programs for an ensembler and for data structuring.

FIG. 1 is a high-level block diagram of an embodiment of a system for extracting key/value pairs from document images. Document images 102 comprise a plurality of images where each image is a digitized document with each pixel encoded as a plurality of bits. For example, a common encoding is each pixel being represented in an RGB encoding of 8-bits per color dimension for a total of 24-bits per pixel. In certain embodiments, the document images 102 are encoded with each being a 1-bit depth, 1 channel (monochrome) image consisting largely of machine printed text, with the remaining bits per pixel being unused. The images 102 are processed by the modules shown in FIG. 1, and described in further detail below, to generate key/value pairs 124.

Figure 2:
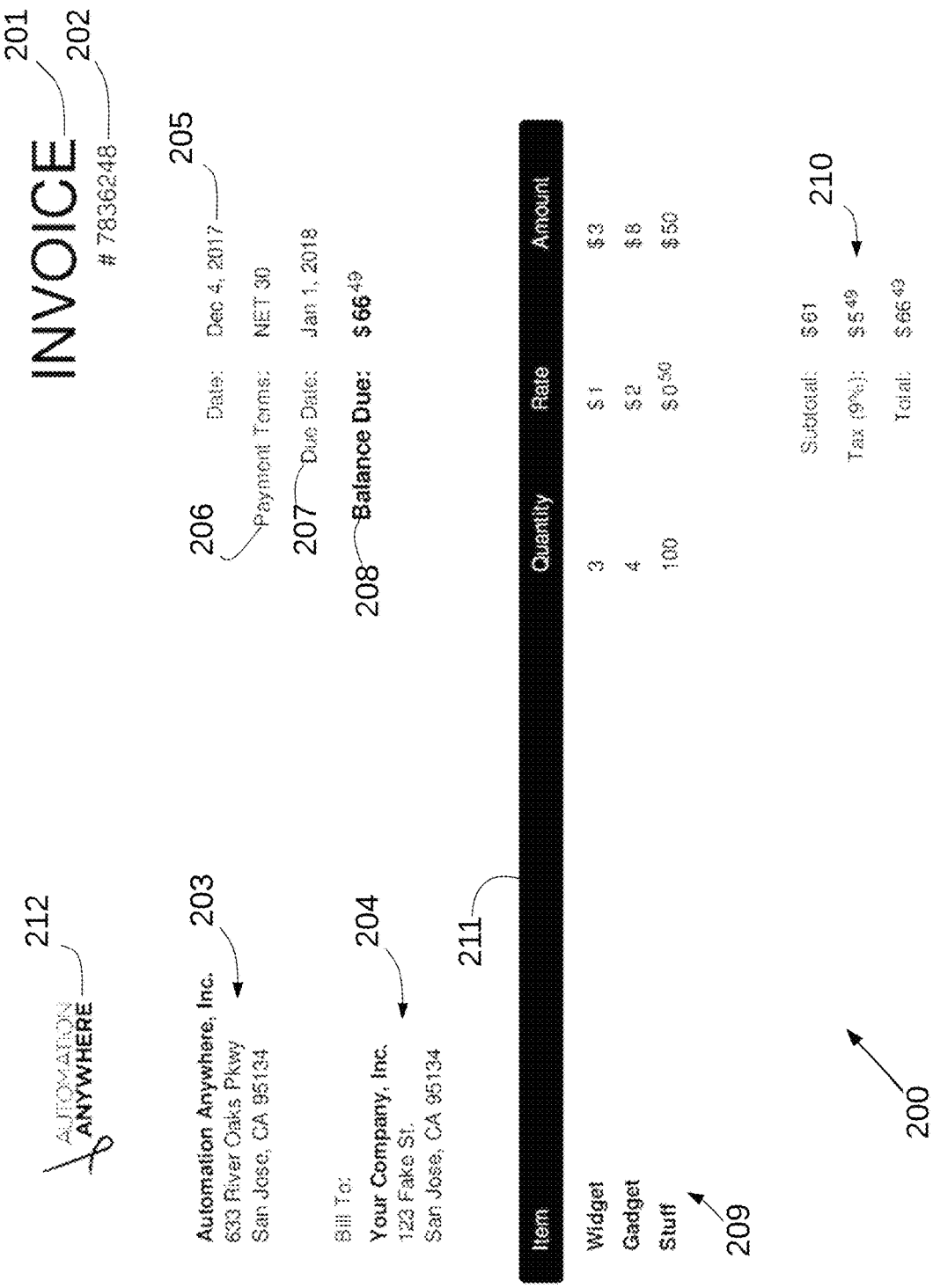
FIG. 2 shows an example of a typical domain document (English-language invoice) converted to a monochrome image.

FIG. 2 shows an example of a typical domain document (English-language invoice) converted to a monochrome image. As seen, invoice 200, which may be one of the document images 102, has a number of labels and associated data fields that are necessary for an invoice. The invoice is labeled as an "invoice" at 201. There is an invoice number 202 that uniquely identifies the invoice. The invoicing entity and address, seen at 203, identify the entity issuing the invoice. The recipient of the invoice is shown at 204. In addition, the invoice has a date field 205, payment terms 206, a due date 207 and a balance due 208. An itemized listing of the items supplied by the invoicing entity is shown at 209, with associated amounts for quantity, rate (price per item), and total amount for the item. Subtotal amount, tax and total are shown at 210. The invoice 200 can also be seen to be formatted with text of different sizes and with varying font characteristics such as the use of bold font in certain places such as for "Balance Due" at 208 for the label "Balance Due" and the associated amount "$66.49". As seen the amount 66.49 is in a form in which the cents are represented in a smaller font, in superscript format. As will be appreciated by those skilled in the art, alternative representations may also be found in other invoices. Different sizes of fonts are also used, such as for Invoice field 201 which is in a larger font than other fields. A company logo is also seen at 212. Also, a table header bar is seen at 211 with text in reverse color (white on black) contained therein.

Taking the example of FIG. 2 the system 100 first attempts to draw bounding boxes around all 9 key/value pairs in the document: key="INVOICE", value="#7836248" at 201 and 202; key="Date:", value="Dec. 4, 2017" at 205; key="Payment Terms:", value="NET 30" at 206; key="Due Date:", value="Jan. 1, 2018" at 207; key="Balance Due:", value="$66.49" at 208; key="Bill To:", value="Your company, Inc. 123 Fake St. San Jose, Calif. 95134" at 204; key="Subtotal:", value="$61" near 210; key="Tax (9%)", value="$5.49" near 210; and key="Total:", value="$66.49" near 210. It must be pointed out that the key/value arrangements can have a large variety above and beyond what is illustrated in FIG. 2. Seven out of nine key/value pairs in FIG. 2 have the key on the left and the value on the right. The spacing between them can vary. We have seen examples where key and value are separated by more than half the page width. There are two examples of key on top and value on the bottom (201/202 and 204). The value could also span multiple and variable number of lines worth of printed text. More variants of these arrangements are possible. It must also be pointed out that not every top-bottom arrangement is a key/value pair. For example, the object detection DNN should be trained not to draw a bounding-box around key="Rate", value="$1" in the table header 211. The above illustration with FIG. 2 is simply exemplary and those skilled in the art to practice the invention can appreciate the challenge and difficulty in the object detection problem being addressed in this disclosure.

Figure 3:
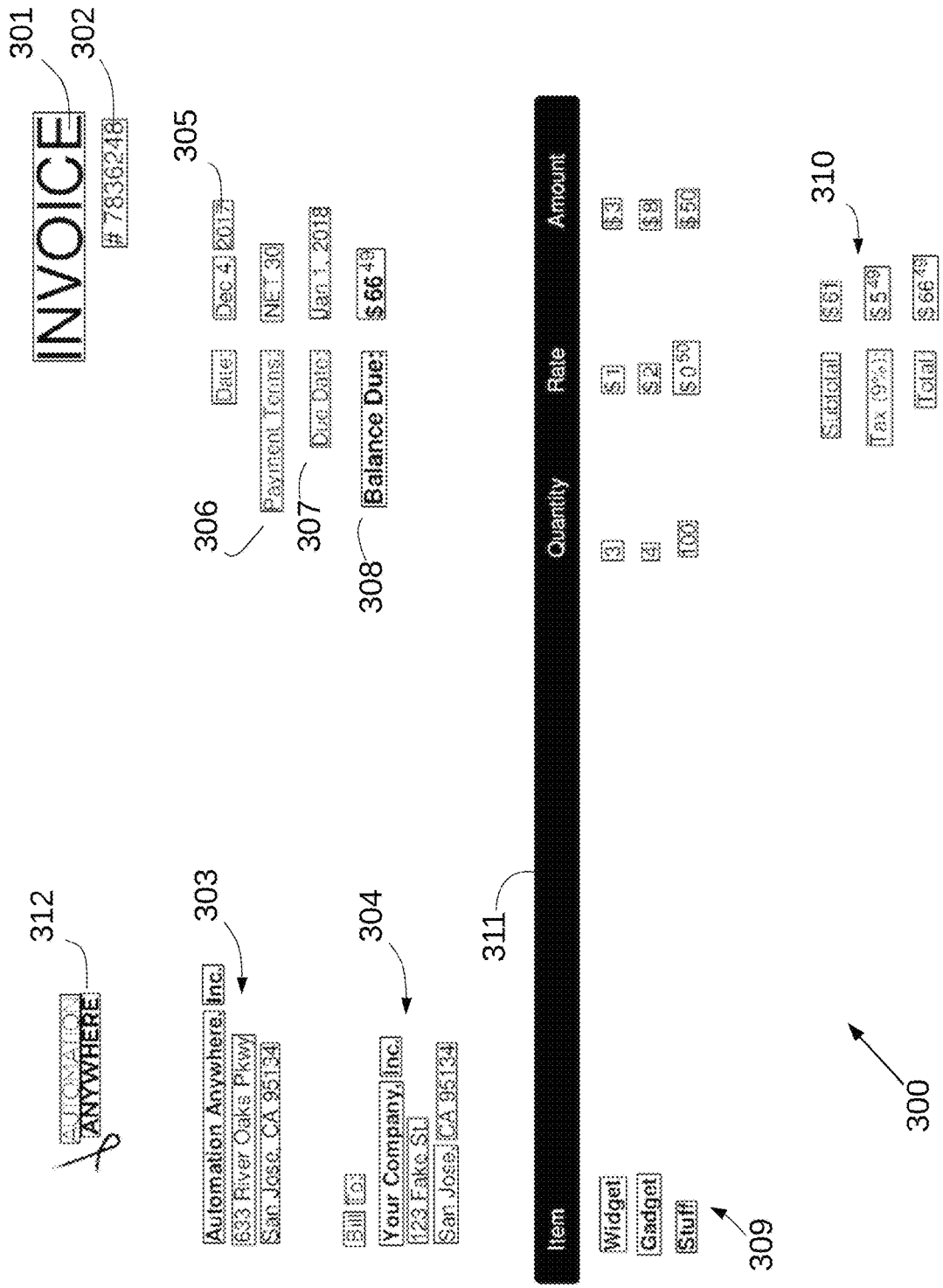
FIG. 3 shows a segmented version of the domain document of FIG. 2.

The document images 102 may each processed by segmentation module 104 which implements a rule-based process that utilizes a connected components algorithm to create character-level segmentations with further heuristics to join character segmentation into word-level segmentation. In one embodiment, the segmentation module 104 operates conventionally to break up document image 102 into sub-images of characters, words, or even group of contiguous words in a line. In contrast to conventional OCRs, that decode one character at a time, OCRs based on a neural network (such as may be used in certain embodiments) can decode groups of words in one shot. Isolating a sub-image of one character from a black-and-white document image is usually performed by identifying streaks of black pixels. These character segmentations are then combined horizontally allowing for inter-letter white space to form word segmentation, and further combined horizontally allowing for inter-word white space. These sub-images of groups of words are processed one by one by the OCR module 106 to produce digitized text. An example output of segmentation module 104 is seen in FIG. 3 which shows a segmented version of the domain document of FIG. 2. The rectangles illustrate "word" segmentation. Note that the coordinates of each rectangle, seen at 301-310 is stored, but not explicitly drawn on the document image itself during segmentation.

The OCR module 106 takes image segments and produces digital text based on the recognized characters in the image segment. The OCR module 106 may take a conventional form or may employ the systems/methods disclosed in patent application entitled Optical Character Recognition Employing Deep Learning With Machine Generated Training Data and assigned to the assignee of the present application, which is hereby incorporated by reference in its entirety.

DNNs for object detection are typically constructed to use RGB images with 24 bits-per-pixel, whereas black-and-white documents are 1 bit-per-pixel. The most common way to represent a 1 bit-per-pixel image in 24-bit format is to replicate pixel values across all three (R, G, and B) channels and restrict pixel values to be either (0,0,0) for black or (255,255,255) for white. Such a representation is both repetitive and sparse. Embodiments disclosed herein advantageously fill in this sparsity and remove the repetitive data for document images to better utilize existing DNN architectures.

Image pre-processing module 108 provides pre-processing procedures (109-112) that annotate additional information in the document image 102 to generate annotated document image 113 for improving performance of object detection module 116. In one embodiment, object detection module 116 is designed for 24-bit RGB (Red, Green, Blue) encoded image, and provides room for 23 bits-per-pixel of additional information, which are generated by module 108. Image pre-processing module 108 contains functions that alter the appearance of the document image for the purpose of adapting the image to improve the performance of object detection module 116. The various modules 109-112 within image pre-processing module 108 may be employed independently. In certain embodiments, only one preprocessing is performed and the annotated image 113 is sent to the object detection module 116. In other embodiments, multiple pre-processing modules 109-112 may be employed, i.e. two or more operations are applied to the image before the annotated document image 113 is sent to the object detection module 116.

Common key module 107 provides to image pre-processing 108 a list of keywords strings and their occurrence frequency for the domain of documents. For example, a list for English language invoices would contain multiple instances of the key labels "Invoice #", "INVOICE NUM", "Ship To", etc.

The key marker module 109 marks up a document image with the probability of text segments being a key based on prior knowledge about a domain of interest. The posterior probability is computed based on extracted text (from OCR 106) and according to a reference common keys according to an expanded form of Bayes' theorem:

$$p(\text{KEY} \mid \text{word}) = \frac{p(\text{word} \mid \text{KEY})p(\text{KEY})}{p(\text{word} \mid \text{KEY})p(\text{KEY}) + p(\text{word} \mid \neg \text{KEY})p(\neg \text{KEY})}.$$

For our adaptation, the above formula can be rewritten as:

$$p(\text{KEY} \mid \text{word}) = \frac{p(\text{word} \mid \text{KEY})p(\text{KEY})}{p(\text{word} \mid \text{KEY})p(\text{KEY}) + p(\text{word} \mid \text{VALUE})p(\text{VALUE})}$$

In the above formulae "p(KEY|word)" denotes the probability of a given word being a KEY, "p(word|KEY)" denotes the likelihood of occurrence of a given word among a corpus of all KEYs, "p(KEY)" denotes the prior probability of a randomly picked word being a KEY, "p(word|¬KEY)" denotes the likelihood of occurrence of a given word among a corpus of all words that are not a KEY, "p(¬KEY)" denotes the prior probability of a randomly picked word not being a KEY, "p(word|VALUE)" denotes the likelihood of occurrence of a given word among a corpus of all VALUEs, and p(VALUE) denotes the prior probability of a randomly picked word being a VALUE. The above adaptation is possible since a word can either be a KEY or a VALUE, and there is no third class. In one embodiment, these quantities are estimated by collecting a large corpus of words from domain documents (with likelihoods represented in the multiplicity of a particular word occurring in the corpus), labeling each word as either KEY or VALUE depending on its usage in the source document, and counting number of occurrences per word. This corpus is shown as common key module 107. In one embodiment, a separate additional channel of the document image is then programmatically annotated with a rectangular mask around every text segment. The pixel value in the additional channel is derived from the probability "p(key|word)" for each text segment, for example, probability of 1 would be the value 255 in the R channel, and probability of 1 would be the value 0 in the R channel. In this way, each image segment provided by 104 will be marked visually representing the probability of that segment being a key.

Figure 5:
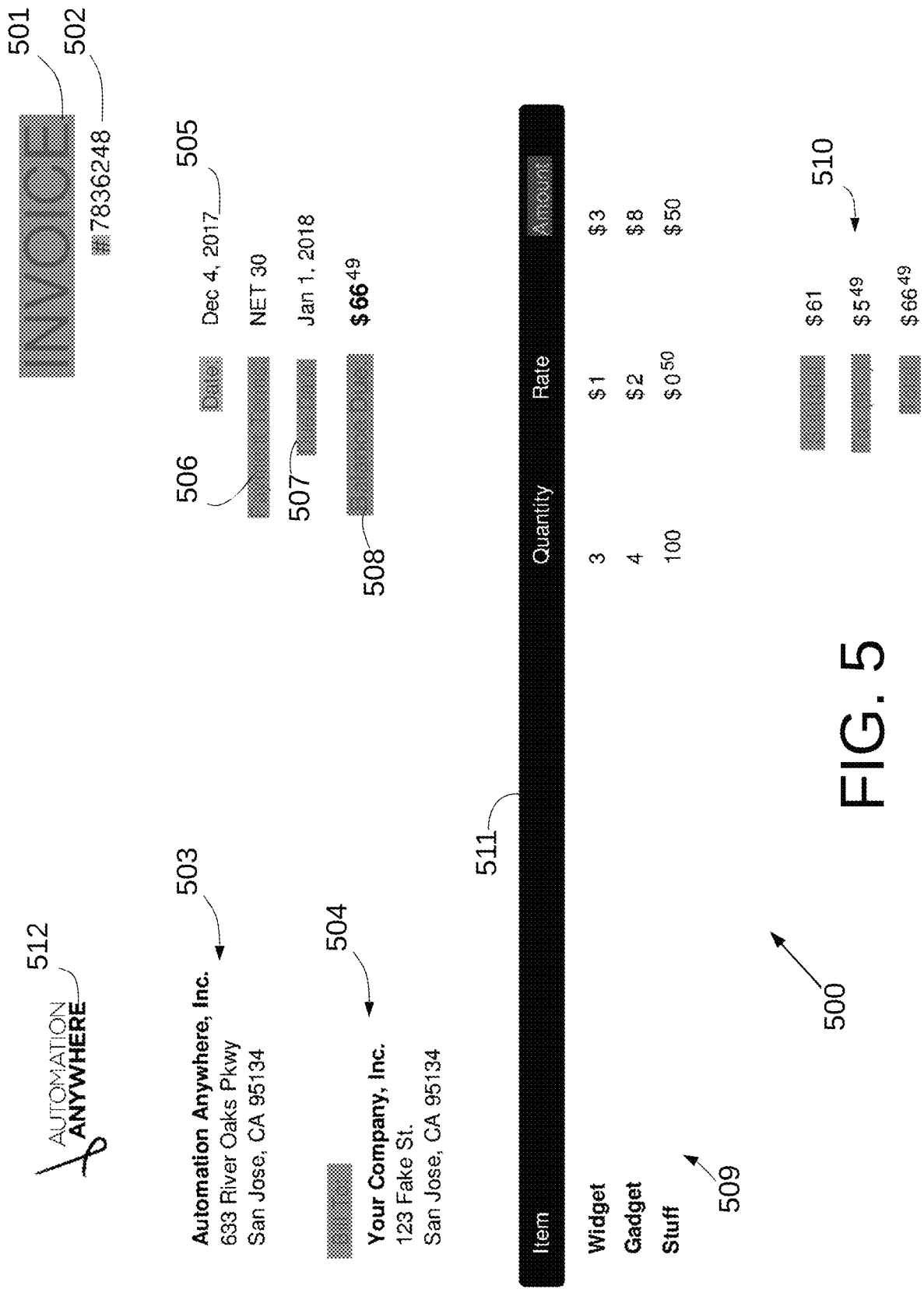
FIG. 5 shows the segmented document of FIG. 3 marked with probabilities of the text word being a Key.

FIG. 5 shows the segmented document of FIG. 3 marked with probabilities as generated by key marker 109. The red channel in this image is mapped to the probability of the underlying segment being a key. The original colored image of FIG. 5 would show red colored rectangles around "INVOICE" at 501, "#" at 502, "Date:" at 505, "Payment Terms:" at 506, "Due Date:" at 507, "Balance Due:" at 508, "Bill To:" at 504, "Rate" and "Amount" inside table header 511, and "Subtotal:", "Tax (9%):", "Total:" at 510. Furthermore, the degree of redness of these 11 colored rectangles is different and proportional to probability of text words being a KEY. For example, the colored rectangle around "Bill To:" at 504 is more red representing a probability of 0.98, whereas the colored rectangle around "Rate" inside table header 511 is less red representing a probability of 0.61. This scheme of adding additional hints in the pre-processed image helps improve the recall of DNN predictions by not requiring the deep learning algorithm to associate many different text strings with keys. Instead it can use the provided colored rectangles of different values as a more salient guide. In other embodiments, the probabilities of a word being a KEY can be annotated without consuming additional bits out of the 23 unused bits. In such a scheme, we overlay black colored rectangles on the original image and using the same 1-bit allocation for the original image (by converting pixels along the rectangles as black). We overlay black rectangles only around those text words that have probability p(KEY|word)>0.5. Other alternate schemes are also possible.

H/V filter 110 performs vertical filtering by running an averaging 2-D filter across the original document image and replacing one of the RGB channels with the V-filtered image. In one embodiment, the V-filtered image may utilize 8 out of the 23 unused bits. The height of the filter kernel is chosen to be approximately equal to the average distance between text lines in our domain of document images. The width of the filter kernel is set to a low number. Horizontal filtering is performed by running an additional averaging 2-D filter across original document image 102 and replacing one of the RGB channels with the H-filtered image. In one embodiment, the H-filtered image may utilize 8 out of the 23 unused bits. The width of the filter kernel is chosen to be approximately equal to the average segment width of key/value pairs in our domain of document images. The height of the filter kernel is set to a low number.

Figure 6:
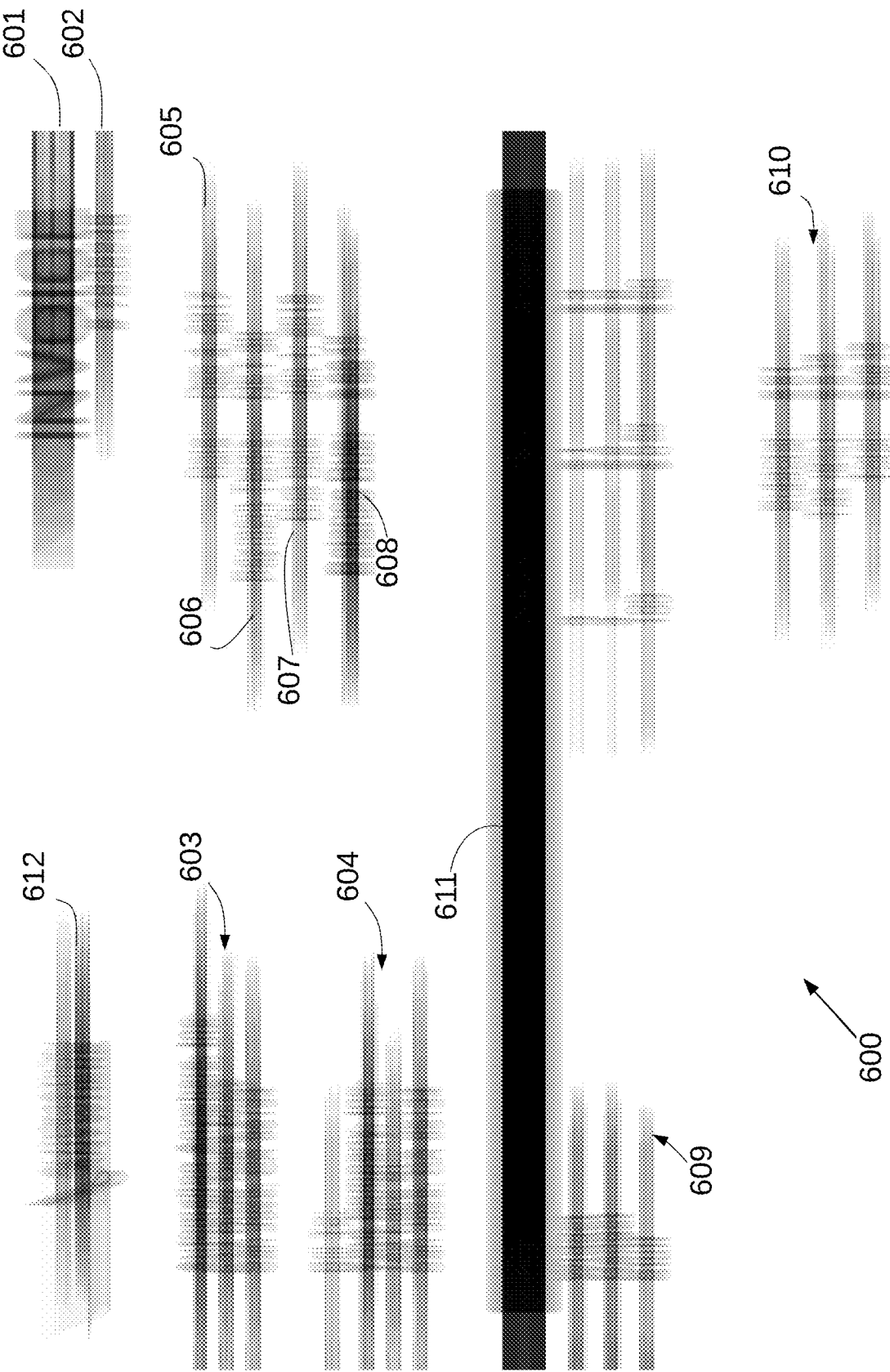
FIG. 6 illustrates output of an H/V filter.

In one embodiment, the final H/V filter image is composed of 1 channel (1-bit of G channel with remaining 7-bits of G-channel unused) containing the original image, 1 channel (8-bits of B channel) replaced by the V-filtered image, and 1 channel (8-bits of R channel) replaced by the H-filtered image. This novel image pre-processing step has the effect of blurring the original image, joining neighboring characters in a line and/or across successive lines, and converting the final image to mimic a natural image. This has been shown to help improve the performance of the DNNs. The term "natural image" as used herein refers to images (e.g. pictures) of physical objects, for example, fruit, vehicles, humans, animals, etc. FIG. 6 illustrates output of H/V filter 110. The image in FIG. 6 shows the V-filtered image output on B channel, and the H-filtered image output on R channel. The original colored version of FIG. 6 would reveal blue-colored blurring of text words in vertical direction and red-colored blurring of text words in horizontal direction. The reference numbers 601-612 in FIG. 6 reference the portions referenced by reference numbers 501-512 in FIG. 5.

DNN systems work most efficiently when the input image data has a tight statistical distribution, or in other words, the input images are as similar looking as possible. There are several factors in document images that contribute to wide statistical distribution. Document images may contain noise from analog to digital image transformation. Some noise comes from scanning artifacts, some noise comes from the destructive process of binarization (that is, converting to monochrome format). The same document going through two document image-conversion pipelines may result in two very different images. Furthermore, a document image may exist with a wide variety of fonts, fonts sizes, background patterns, and lines (e.g., to delineate table columns). All these aspects cause a document image to have a large number of variants that may be vastly different in appearance (even through the inherent text data is the same), thereby resulting in the object detection DNN needing to learn about different typefaces.

Normative renderer module 111 uses the output of OCR 106 to generate an image-free representation of document image 102. The document image is rendered in a standard font on a blank canvas (with no noise) preserving the X, Y coordinates of each text segment in the original image. The module 111 also drops backgrounds, patterns, and lines from the original image. The resulting image is a noise free, uniform font rendering of the original document providing a simplified image for the DNN to learn from. This pre-processing advantageously reduces the statistical distribution of input images. The physical appearance of the normative renderer output image has the unwanted variations removed. The output of normative rendered 111 is seen in FIG. 7. As seen, only location, size and content are retained. All text elements 701-710, 712 are rendered with a single font and the white-on-black rendering of Table Header 211 (of FIG. 2) is replaced with a simpler render.

Document images are mostly sparse images, containing anywhere from 5%-12% black pixels and remaining white spaces. Noise module 112 adds regular gaussian distributed noise to images to teach the network invariance to small regular perturbations in document images. High quality picture images contain no distortions in blur, contrast, or pixel-value noise due to image scanning or compression artifacts. However real-life images have distortions and the DNN 117 (described in this disclosure) is required to make correct predictions in presence of such distortions. Adding random controlled noise in images is one way to provide such distortions during DNN training.

Figure 4:
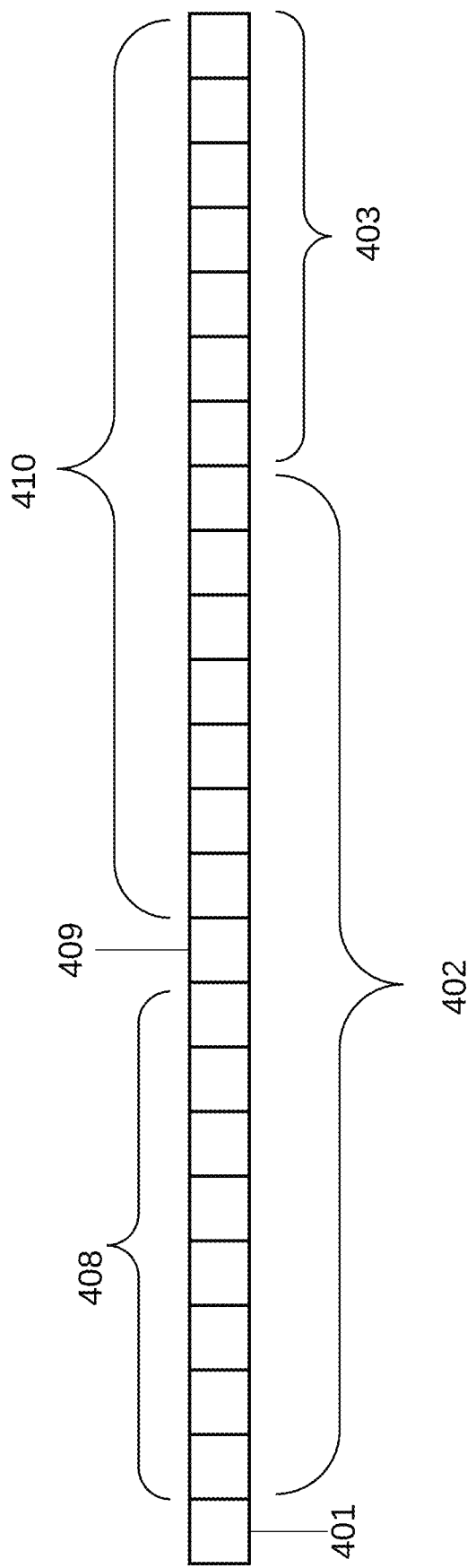
FIG. 4 illustrates examples of a pixel annotated with additional information to facilitate object-detection performed by a Deep Neural Network (DNN).

FIG. 4 illustrates an example of a 24-bit output as generated by the image pre-processing module 108. The encoding of the bits in the 24-bit output will vary according to which pre-processing modules 109-112 are employed. In one embodiment, all four pre-processing modules 109-112 are employed to generate 23 additional bits for the 24-bit output. In such an embodiment, bit 401 represents the 1-bit depth, 1 channel image as encoded in document image 102, with the remaining 23 bits being provided by image pre-processing 108. In such an embodiment, 16 bits (402) are generated by module H/V Filter 110, 7 additional bits (403) are generated by module Noise 112 by adding noise to all 3 channels. In another embodiment, bit 401 represents the 1-bit depth, 1 channel image as encoded in document image 102, 8 bits (408) are generated by module Key Marker 109, 1 additional bit (409) is generated by replicating bit 401 to create a third channel, and 14 additional bits (410) can then be generated by module Noise 112.

Document images in a business environment, such as an image of an invoice, may be in excess of 2000×2000 pixels depending on the original scanning resolution. Hardware limitations, specifically memory requirements on graphics processing units, cause the need to scale down the original image before the DNN can run on the image during training. Downscaling images is always a destructive process, causing the loss of information. To avoid this, in certain embodiments, split module 114 splits the image into N overlapping sub-images. Each sub-image is then fed into DNN 117 within the object detection module 116 and a prediction is generated. After each sub-image is given its predictions by object detection module 116, the join module 118 rejoins the sub-images and the predictions. In other embodiments, splitting may not be employed, (N=1) in which case the image should be downscaled to an acceptable size fitting within the memory requirements of the graphics processing unit employed for DNN training. In such an embodiment join module 118 is not needed. The image splitting scheme is also motivated by the fact that it limits the number of BB predictions that the DNN is required to make.

Figure 10:
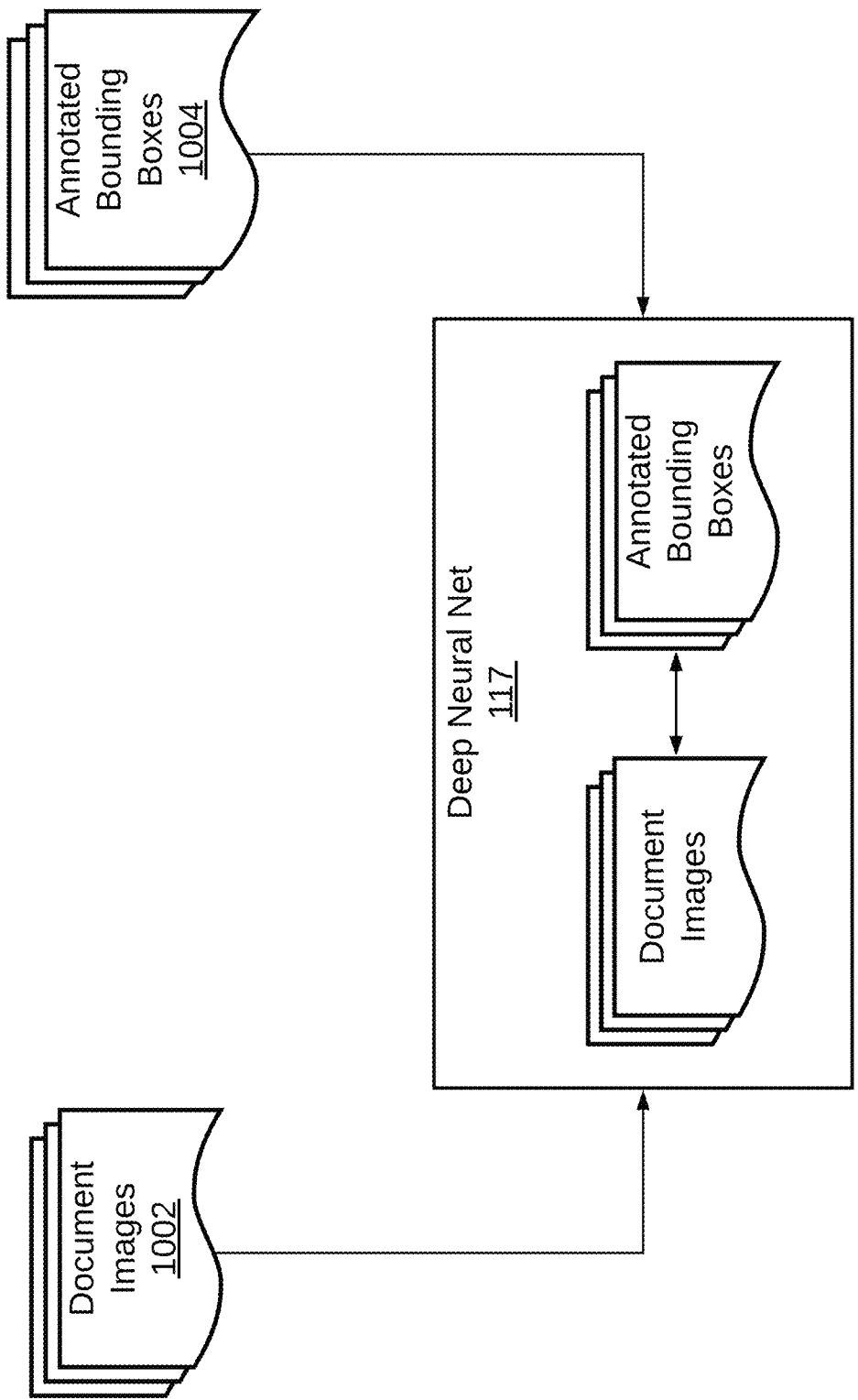
FIG. 10 illustrates the training of the Deep Neural Network (DNN) of FIG. 1.

Preferably, object detection module employs DNNs to generate BB predictions. An example of such DNNs is Faster R-CNN, such as described by Shaoqing Ren et al. in "Faster R-CNN: Towards Real-Time Object Detection with Region Proposal Networks", Microsoft Research. Another example is SSD, such as described by Wei Liu et al. in SSD: Single Shot MultiBox Detector, Proceedings of the European Conference on Computer Vision (ECCV) (2016). Another example is YOLO, such as described by Joseph Redmon, et al. in "YOLO9000: Better, Faster, Stronger, Univ. of Washington, Allen Institute for AI (2016). These are exemplary of the DNNs that may be employed and any Convolutional Neural Network (CNN) based object detection architecture can be employed. FIG. 10 illustrates the training of the DNN. During the training phase, document images 1002 and human created annotations of BBs 1004 are fed into the DNN 117. The DNN 117 learns a function that maps images 1002 to BBs 1004. During the prediction phase, the DNN 117 applies the learned function to an image 102 to produce a novel set of BBs for that image.

Ensembler module 120 takes in predictions from the previous stages in the pipeline and creates one final version of the spatial template. To create a final prediction the preprocessing 108, split 114, object detection 116, and join 118 modules are run N number of times, for each run changing at least one parameter in one or more of the preprocessing 108, split 114, or object detection 116 modules. The parameter that is changed could be anything from the type of object detection network to preprocessing step(s) that are used. The input to the ensembler 120 is thus many BB predictions for each key/value pair. Merges are made according to a non-maximum suppression algorithm in an attempt to create one BB for each key/value pair. At this stage predictions with low-confidence may be removed as well.

The computer system 100 employs object detection 116 including deep learning system DNN 117 which employs a conventional class of machine learning algorithms to draw bounding boxes around key/value pairs. As will be appreciated by those skilled in the art, such algorithms are characterized by a cascade of multiple layers of nonlinear processing units for feature extraction and transformation. Each successive layer uses the output from the previous layer as input. Such algorithms may learn in supervised and/or unsupervised manners, and may learn multiple levels of representations that correspond to different levels of abstraction. Moreover, a form of gradient descent for training via backpropagation may be employed. Deep learning system 117 operates with training images pre-processed by image pre-processing 108, stored in conventional data storage, that is generated to train deep learning system 117. For example, if the domain of interest is English language invoices, then the training images will comprise a large number (e.g. a few tens of thousands) of invoices in which human workers will draw bounding boxes around all key/value pairs in the invoice image. The image after preprocessing (108) along with a set of rectangle coordinates (manually produced by human workers) forms the training data for DNN 117.

Figure 8:
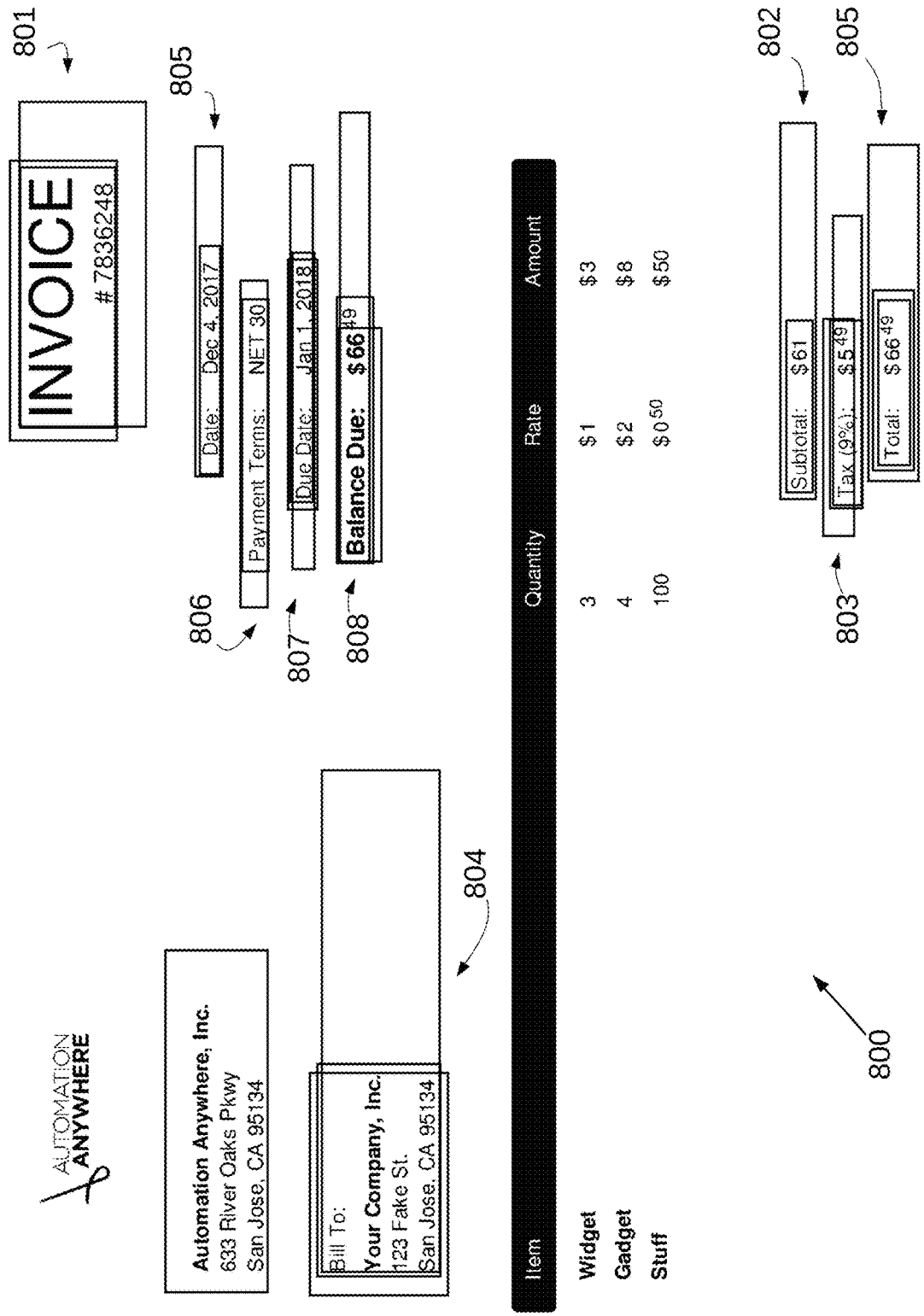
FIG. 8 illustrates sample input for the ensembler of FIG. 1.

FIG. 8 illustrates sample input for the ensembler 120 of FIG. 1. Each key/value pair segment 124 may have more than one predicted bounding box. For example, as seen at 801, 803, 804, 807, and 808 where three BBs are seen, and at 802, 805, 806 where two BBs are seen.

FIG. 9 illustrates sample output for the ensembler 120. The ensembler 120 processes the joined sub-images provided by join module 118 to ensure each key/value pair has at most one predicted bounding box. As seen, multiple BBs as seen at 801-808 have been merged by ensembler 120 into corresponding single BBs as seen at 901-908.

Data structuring module 122 takes a spatial template and location tagged text segments and structures the text into key/value pairs. Data structuring is a statistically learned mapping from a set of known KEY string values to a semantic category, for example all KEY strings "P.O. #", "P.O.", "PO", "P.O. Num", "P.O. #" map to the same semantic category "PO Number". The user can select which semantic category should make it to the final stage. The (key, value) for only chosen semantic categories are displayed to the user. For example, the user may choose to only extract three semantic categories, "Invoice Number", "Invoice Date", and "Billing Address", and the system 100 should output key="INVOICE", value="#7836248" at 901; key="Date:", value="Dec. 4, 2017" at 905; key="Bill To:", value="Your Company, Inc. 123 Fake St. San Jose, Calif. 95134" at 904. All others are dropped, for example, key="Payment Terms:", value="NET 30" at 906. The training process, shown in FIG. 10, is required by the DNN 117 to learn a function that maps BBs to images. During this phase, all stages of the pipeline up to the ensembler 120 (see FIG. 1) are run. During this phase, human-labeled (BBs described) images are used to train the object detection DNN 117 after applying image preprocessing. After an acceptable function has been learned during training, an object detection model is created for prediction.

During the prediction phase, shown in FIG. 1, all stages of the pipeline shown in FIG. 1 are run. The DNN 117 uses the model created during the training phase and no human-labeled images are used. Note that even during prediction the pre-processing modules 108, same as the one used during training, need to be applied.

Figure 11:
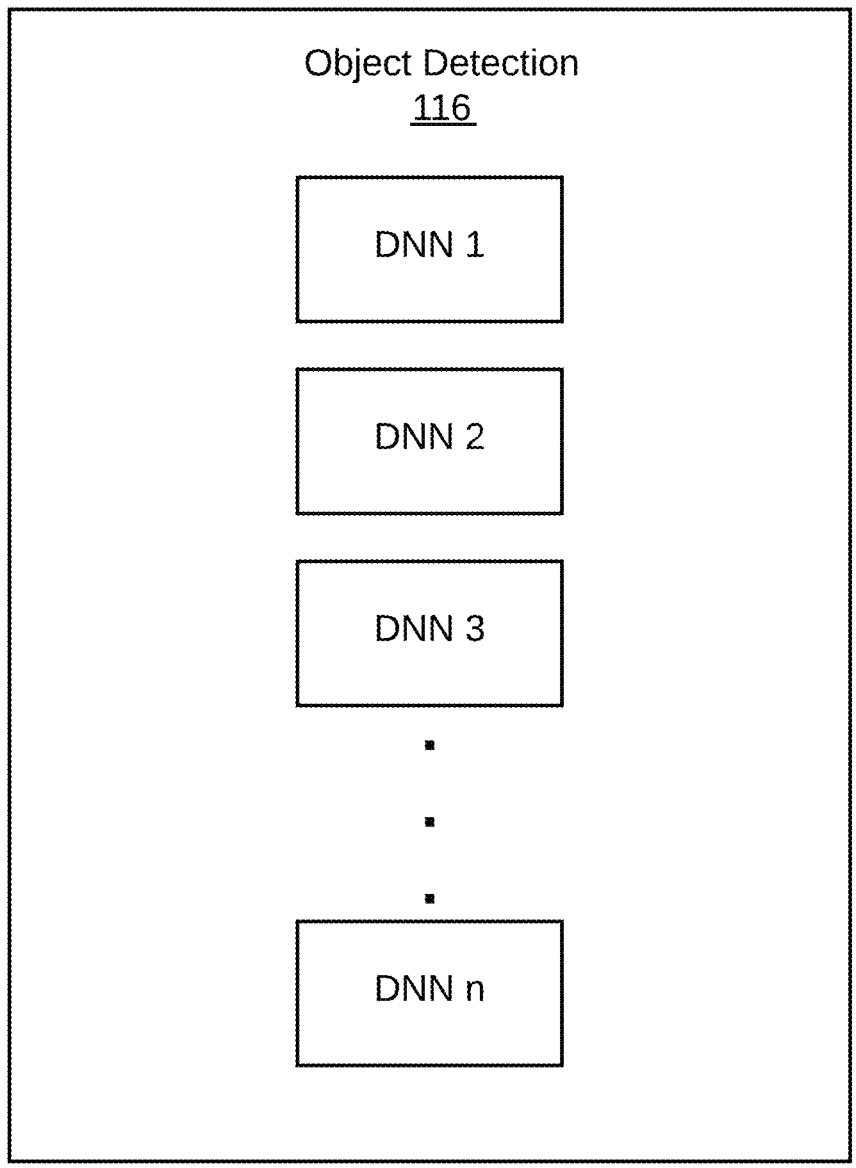
FIG. 11 illustrates an alternate embodiment of the object detection module of FIG. 1.

An alternative embodiment of object detection module 116 is shown in FIG. 11. The object detection module 116 may employ multiple DNNs 117 with the prediction of each DNN (DNN 1-DNN n) provided to the ensembler 120. As previously explained in connection with the embodiment shown in FIG. 1, the image pre-processing module 108 may be run N number of times, for each run changing at least one parameter in one or more of the preprocessing 108, split 114, or object detection modules 116. The parameter that is changed could be anything from the type of object detection network to preprocessing step(s) that are used. The input to the ensembler 120 is thus many BB predictions for each key/value pair. Merges may be made according to a non-maximum suppression algorithm in an attempt to create one BB for each key/value pair. At this stage predictions with low-confidence may be removed as well.

Figure 12:
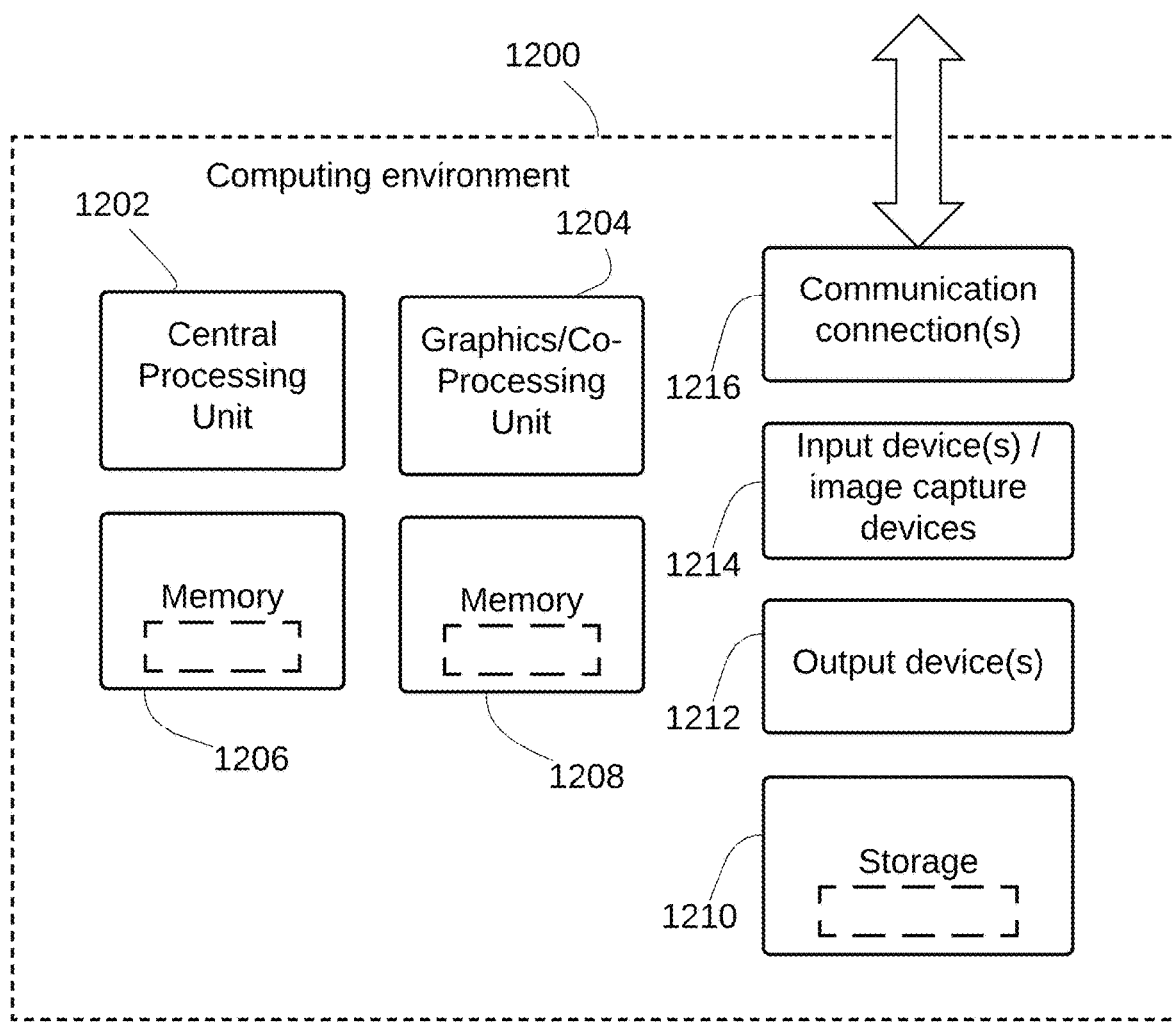
FIG. 12 illustrates a block diagram of hardware that may be employed in an implementation of the system 100.

FIG. 12 depicts a generalized example of a suitable general-purpose computing system 1200 in which the described innovations may be implemented in order to improve the processing speed and efficiency with which the computing system 1200 operates to perform the functions disclosed herein. With reference to FIG. 12 the computing system 1200 includes one or more processing units 1202, 1204 and memory 1206, 1208. The processing units 1202, 1206 execute computer-executable instructions. A processing unit can be a general-purpose central processing unit (CPU), processor in an application-specific integrated circuit (ASIC) or any other type of processor. The tangible memory 1206, 1208 may be volatile memory (e.g., registers, cache, RAM), non-volatile memory (e.g., ROM, EEPROM, flash memory, etc.), or some combination of the two, accessible by the processing unit(s). The hardware components in FIG. 12 may be standard hardware components, or alternatively, some embodiments may employ specialized hardware components to further increase the operating efficiency and speed with which the system 100 operates.

Computing system 1200 may have additional features such as for example, storage 1210, one or more input devices 1214, one or more output devices 1212, and one or more communication connections 1216. An interconnection mechanism (not shown) such as a bus, controller, or network interconnects the components of the computing system 1200. Typically, operating system software (not shown) provides an operating system for other software executing in the computing system 1200, and coordinates activities of the components of the computing system 1200.

The tangible storage 1210 may be removable or non-removable, and includes magnetic disks, magnetic tapes or cassettes, CD-ROMs, DVDs, or any other medium which can be used to store information in a non-transitory way and which can be accessed within the computing system 1200. The storage 1210 stores instructions for the software implementing one or more innovations described herein.

The input device(s) 1214 may be a touch input device such as a keyboard, mouse, pen, or trackball, a voice input device, a scanning device, or another device that provides input to the computing system 1200. For video encoding, the input device(s) 1214 may be a camera, video card, TV tuner card, or similar device that accepts video input in analog or digital form, or a CD-ROM or CD-RW that reads video samples into the computing system 1200. The output device(s) 1212 may be a display, printer, speaker, CD-writer, or another device that provides output from the computing system 1200.

The communication connection(s) 1216 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computerized method for identifying keyword strings and associated values from a document image, comprising:
   receiving the document image from a document storage, wherein the document image comprises a plurality of pixels and wherein each pixel within the document image is represented by a plurality of bits contained in a computer system storage;
   modifying the document image, from a first version of the document image to a second version of the document image;
   allocating for each pixel of the plurality of pixels, a first subset of bits representing information corresponding to the second version of the document image; and
   allocating for each pixel, a second subset of bits wherein the second subset of bits does not overlap with the first subset of bits, and setting the value of each bit within the second subset of bits for each pixel, to represent the second version of the document image in a manner selected to facilitate recognition of textually encoded segments within the document image by a deep neural network trained to recognize objects within an image;
   detecting by the deep neural network, groupings of text segments in the document image, wherein each grouping of text segments in the document image is associated with a spatial template; and
   mapping the text segments in the groupings of text segments in the document image to known string values to identify the keyword strings and associated values, wherein the keyword string is representative of semantic meaning of a grouping of text segments.

2. The computerized method of claim 1 wherein the known string values correspond to a known domain associated with the document images.

3. The computerized method of claim 1 wherein modifying the document image from a first version of the document image to a second version of the document image further comprises:
   processing the document image to recognize textually encoded segments; and
   annotating the textually encoded segments with a probability value indicative of probability of the text segments representing a known keyword string; and
   wherein setting the value of each bit within the second subset of bits for each pixel corresponds to the annotated probability value indicative of the probability of the text segments representing a known keyword string.

4. The computerized method of claim 1 wherein processing the document image to modify the bits for each pixel, to allocate for each pixel, a second subset of bits wherein the second subset of bits does not overlap with the first subset of bits, and to add information to the second subset of bits for each pixel, to alter the appearance of the document image in a manner selected to facilitate semantic recognition of textually encoded segments within the document image by a deep neural network trained to recognize objects within an image comprises:
   blurring the document image by joining neighboring characters in a line and across successive lines in the document image, and
   converting the document image to mimic a natural image.

5. The computerized method of claim 1 wherein processing the document image to modify the bits for each pixel, to allocate for each pixel, a second subset of bits wherein the second subset of bits does not overlap with the first subset of bits, and to add information to the second subset of bits for each pixel, to alter the appearance of the document image in a manner selected to facilitate semantic recognition of textually encoded segments within the document image by a deep neural network trained to recognize objects within an image comprises:

removing backgrounds, patterns, and lines from the document image to generate a noise free, uniform font rendering of the document image.

6. The computerized method of claim 1 wherein processing the document image to modify the bits for each pixel, to allocate for each pixel, a second subset of bits wherein the second subset of bits does not overlap with the first subset of bits, and to add information to the second subset of bits for each pixel, to alter the appearance of the document image in a manner selected to facilitate semantic recognition of textually encoded segments within the document image by a deep neural network trained to recognize objects within an image comprises:
adding regular gaussian distributed noise to the document image.

7. The computerized method of claim 1 wherein processing the document image to modify the bits for each pixel, to allocate for each pixel, a second subset of bits wherein the second subset of bits does not overlap with the first subset of bits, and to add information to the second subset of bits for each pixel, to alter the appearance of the document image in a manner selected to facilitate semantic recognition of textually encoded segments within the document image by a deep neural network trained to recognize objects within an image comprises:
processing the document image to recognize textually encoded segments; and
processing the textually encoded segments in accordance with a list of keyword strings, each of which has associated therewith an occurrence frequency indicative of occurrence frequency of the keyword string within a domain associated with the document image.

8. The computerized method of claim 1 further comprising:
splitting the document image into a plurality of overlapping sub-images after processing the document image to add information to a second subset of the plurality of bits for each pixel; and
wherein detecting by the deep neural network, groupings of text segments within detected spatial templates within the document image, is performed separately, for each of the sub-images; and
wherein the detected groupings of text segments and associated spatial templates in each of the sub-images are joined before mapping the text segments to known string values to generate the keyword strings and associated values.

9. The computerized method of claim 1 wherein the deep neural network detects a plurality of spatial templates for certain of the groupings of text segments, the method further comprising merging the spatial templates for each grouping of text segments to generate a single merged spatial template for each grouping of text segments.

10. The computerized method of claim 9 wherein merging the spatial templates is performed in accordance with a non-maximum suppression algorithm.

11. The computerized method of claim 9 further comprising removing spatial templates characterized by low-confidence.

12. The computerized method of claim 1 wherein mapping the text segments in the groupings of text segments to known string values to generate the keyword strings and associated values, comprises accessing a mapping of known key string values to a semantic key value to associate each keyword string with a value associated with the keyword string.

13. The computerized method of claim 12 further comprising receiving user selection of semantic key values.

14. The computerized method of claim 1 wherein the first subset of bits for each pixel comprises a single bit in the plurality of bits for a pixel and wherein the second subset of pixels for each pixel comprises any additional bits in the plurality of bits for the pixel.

15. A document processing system comprising:
data storage for storing a plurality of document images, wherein the document image comprises a plurality of pixels and wherein each pixel within the document image is comprised of a plurality of bits; and
a processor operatively coupled to the data storage and configured to execute instructions that when executed cause the processor to:
process the document image to modify the bits for each pixel,
to allocate for each pixel, a first subset of bits representing information of the original image information in the pixel and to add to the first subset of bits for each pixel a modified version of the original image information; and
to allocate for each pixel, a second subset of bits wherein the second subset of bits does not overlap with the first subset of bits, and to add information to the second subset of bits for each pixel, to alter the appearance of the document image in a manner to facilitate recognition of semantic elements within the document image by a deep neural network trained to recognize objects within image documents;
detect by the deep neural network, semantic elements within the document image, wherein each semantic element in the document image, is associated with a spatial template; and
map the semantic elements to known string values to generate keyword strings and associated values, wherein each keyword string is representative of semantic meaning of a corresponding semantic element in the document image.

16. The document processing system of claim 15 wherein the instructions that when executed cause the processor to add information to the second subset of bits for each pixel comprise instructions that cause the processor to:
process the document image to recognize groupings of textually encoded segments; and
annotate the textually encoded segments with a probability value indicative of probability of text segments within the groupings of textually encoded segments representing a known keyword string.

17. The document processing system of claim 15 wherein the instructions that when executed cause the processor to add information to the second subset of bits for each pixel comprise instructions that cause the processor to:
blur the document image by joining neighboring characters in a line and across successive lines in the document image, and
convert the document image to mimic a natural image.

18. The document processing system of claim 15 wherein the second subset of bits for each pixel comprise instructions that cause the processor to:
remove backgrounds, patterns, and lines from the document image to generate a noise free, uniform font rendering of the document image.

19. The document processing system of claim 15 wherein the second subset of bits for each pixel comprise instructions that cause the processor to:

add regular gaussian distributed noise to the document image.

20. The document processing system of claim 15 wherein the first subset of bits for each pixel comprises a single bit in the plurality of bits for a pixel and wherein the second subset of pixels for each pixel comprises any additional bits in the plurality of bits for the pixel.

\* \* \* \* \*